US008458190B2

(12) United States Patent
Spencer et al.

(10) Patent No.: US 8,458,190 B2
(45) Date of Patent: *Jun. 4, 2013

(54) SYSTEMS, METHODS AND SOFTWARE FOR RESEARCHING STATUTORY INFORMATION

(75) Inventors: David Howard Spencer, Woodbury, MN (US); Darla Renae Agard, Eagan, MN (US)

(73) Assignee: Thomson Reuters Global Resources, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/240,456

(22) Filed: Sep. 22, 2011

(65) Prior Publication Data

US 2012/0072450 A1 Mar. 22, 2012

Related U.S. Application Data

(63) Continuation of application No. 11/334,804, filed on Jan. 17, 2006, now Pat. No. 8,032,533.

(60) Provisional application No. 60/644,465, filed on Jan. 14, 2005.

(51) Int. Cl.
*G06F 7/00* (2006.01)
*G06F 17/30* (2006.01)
*G06Q 50/00* (2012.01)

(52) U.S. Cl.
USPC ............................ 707/746; 707/942; 705/311

(58) Field of Classification Search
USPC .................................................. 707/746, 942
See application file for complete search history.

(56) References Cited

U.S. PATENT DOCUMENTS

| 4,558,413 A | 12/1985 | Schmidt et al. |
| 4,627,019 A | 12/1986 | Ng |
| 4,714,992 A | 12/1987 | Gladney et al. |
| 4,853,843 A | 8/1989 | Ecklund |
| 4,875,159 A | 10/1989 | Cary et al. |
| 5,287,496 A | 2/1994 | Chen et al. |
| 5,440,730 A | 8/1995 | Elmasri et al. |
| 5,740,425 A | 4/1998 | Povilus |

(Continued)

FOREIGN PATENT DOCUMENTS

WO  WO-9715890 A1  5/1997

OTHER PUBLICATIONS

Author Unknown, "Retrieving Statutes in Westlaw", pp. 1-4, published 2004.*

(Continued)

*Primary Examiner* — Jeffrey A Burke
(74) *Attorney, Agent, or Firm* — Hoffmann & Baron, LLP

(57) ABSTRACT

With conventional print and electronic tools, researching statutory material is difficult and time-consuming. So, to facilitate this type of research, the present inventors devised systems, methods, and software that promise to improve the ability of researchers to find, verify, read, and/or interpret statutory information. One exemplary system provides options for users to access statutory information by citation, by table of contents, by index, and/or by popular name; presents specific statutory information in combination with visual indicators, such as red or yellow flags, that indicate the validity or status of the information; and provides requested statutory information in context of links to related information, such as tables of contents, other versions of a statute, case law, scholarly materials, legislative history, cross-referenced statutes, and administrative-law materials.

21 Claims, 13 Drawing Sheets

U.S. PATENT DOCUMENTS

| | | | |
|---|---|---|---|
| 5,767,854 | A | 6/1998 | Anwar |
| 5,835,087 | A | 11/1998 | Herz et al. |
| 5,892,513 | A | 4/1999 | Fay |
| 5,963,208 | A | 10/1999 | Dolan et al. |
| 6,026,388 | A | 2/2000 | Liddy et al. |
| 6,144,962 | A | 11/2000 | Weinberg et al. |
| 6,233,592 | B1 | 5/2001 | Schnelle et al. |
| 6,470,490 | B1 | 10/2002 | Hansen |
| 7,293,228 | B1 | 11/2007 | Lessing et al. |
| 2003/0135520 | A1* | 7/2003 | Mitchell et al. ............... 707/200 |
| 2005/0278633 | A1* | 12/2005 | Kemp ........................... 715/713 |

OTHER PUBLICATIONS

Agosti, M., Colotti, R., Gradenigo, G., "A Two-Level Hypertext Retrieval Model for Legal Data,", ACM, (1991) [THOM00196683-THOM00196692].

Arnold-Moore, T. & Sacks-Davis, R., "Databases of Legislation: The Problems of Consolidation," Collaborative Information Technology Research Institute, TR-94-9, Jul. 4, 1994 [THOM00206435-THOM00464].

Arnold-Moore, T., Fuller, M., Lowe, B., Thom, J., Wilkinson, R., "The ELF Data Model and SGQL Query Language for Structured Document Database," (1994) [THOM00196608-THOM00196617].

Arnold-Moore, T., "Automatically Processing Amendments to Legislation," 1995 ACM 0-89791-758-8/95/0005/0297 [THOM00196751-THOM00196760].

Arnold-Moore, T., "Automatic Generation of Amendment Legislation," ICAIL-97, Melbourne, Australia, 1997 ACM 0-89791-924-6/97/96 [THOM00196521-THOM00196527].

Arnold-Moore, T., Anderson, P., Sacks-Davis R., "Managing a Digital Library of Legislation," DL-97, Philadelphia, PA (1997) [TH0M00196741-THOM00196750].

Azaria, A., Network World, "SGML: a Lifesaver in a Sea Electronic Documents," LookSmart, (Dec. 12, 1994) [THOM00196790-THOM00196791].

Bachman, C., "The Programmer as Navigator," Association for Computing Machinery, Inc., Nov. 1973, vol. 16, No. 11, [THOM00204044-THOM00204049].

Bentley, J., Friedman, J., "Data Structures for Range Searching," Computing Surveys, vol. 11, No. 4, Dec. 1979 [THOM00204343-THOM00204355].

Campbell, B., Goodman, J., "HAM: A General Purpose Hypertext Abstract Machine," ACM Jul. 1988,vol. 31, No. 7 [THOM00196867-THOM00196872].

Caplinger, M., "Graphical Database Browsing," ACM (1986) [THOM00208979-THOM00208987].

Haake, A., "CoVer: A Contextual Version Server for Hypertext Applications," Proceedings of the ACM ECHT Conference, Nov. 30-Dec. 4, 1992 [THOM00195956-THOM00195965].

Horne, Roger, "The Statute Law Database," (1997) [THOM00195994-THOM00195997].

Kim, H., Shin, H., Chang, J., "OOHS: An Object-Oriented Hypermedia System," Proceedings of the COMPSAC '96, 0730-3157/96 [THOM00196548-THOM00196553].

Kimball, R., "The Data Warehouse Toolkit: Practical Techniques for Building Dimensional Data Warehouses," John Wiley 1996 [THOM00211947-THOM00211995].

Lo, C., "Integrating Links and Versioning in Document Management,", Australian Computer Science Communications, vol. 17, No. 1(1995) [THOM00207652-THOM00207661].

Lo, C., "Link and Versioning Management in an SGML Based Document Management System,", Department of Computer Science, Royal Melbourne Institute of Technology, Melbourne, Australia (1996) [THOM00202985-THOM00203208].

Noik, E., "Exploring Large Hyperdocuments: Fisheye Views of Nested Networks,", ACM, Hypertext '93 Proceedings (1993) [THOM00197536-THOM00197549].

Osterbye, K., "Structural and Cognitive Problems in Providing Version Control for Hypertext,", ACM, Milano, Nov. 30-Dec. 4, 1992 [THOM00197603-THOM00197612].

Promenschenkel, G., "STEPS toward a new era in electronic publishing," OCLC Newsletter No. 216, published by OCLC, Jul./Aug. 1995 [THOM00196578-THOM00196580].

Sacks-Davis, R., Arnold-Moore, T., Zobel, J., "Database Systems for Structured Documents," Int'l. Symposium on Advanced Databse Technologies and Their Integration, Japan, Oct. 1994 [THOM00198835-THOM00198846].

Sacks-Davis, R., Kent, A., Ramamohanarao, K., Thom, J., Zobel, J., "Atlas: A Nested Relational Database System for Text Applications," IEEE Transactions on Knowledge and Data Engineering, vol. 7, No. 3 Jun. 1995 [THOM00197969-THOM00197985].

Sciore, E., "Multidimensional Versioning for Object-Oriented Databases," Lecture Notes in Computer Science, Deductive and Object-Oriented Databases, Second Int'l. Conference, DOOD '91, Munich Germany (1991) [THOM00209291-THOM00209307].

Sciore, E., "Versioning and Configuration Management in an Object-Oriented Data Model," VLDB Journal 3, 77-106 (1994) [THOM00206121-THOM00206150].

Stonebraker, M., Rowe, L., Hirohama, M., "The Implementation of Postgres," IEEE Transactions on Knowledge and Data Engineering, vol. 2, No. 1, Mar. 1990 [THOM00203349-THOM00203366].

Stonebraker, M., Chen, J., Nathan, N., Paxson, C., Wu, J., "Tioga: Providing Data Management Support for Scientific Visualization Applications,", Computer Science Division, Univ. of CA, Berkeley, CA, 1994 IEEE Symposium on Visual Languages (1994) [THOM00209213-THOM00209226].

Taylor, C., Tudhope, D., Beynon-Davies, P., "Technical Briefing Representation and Manipulation of Conceptual Temporal and Geographical Knowledge in a Museum Hypermedia System," ECHT '94 Proceedings, Sep. 1994 [THOM00198022-THOM00198027].

Travis, B., Waldt, D., "The SGML Implementation Guide: A Blueprint for SGML Migration," Springer-Verlag, Germany (1995) [THOM00204371-THOM00204649].

Wilkinson, R., Arnold-Moore, T., Fuller, M., Sacks-David, R., Thom, J., Zobel, J., "Document Computing: Technologies for Managing Electronic Document Collections,", RMIT University, Melbourne, Australia (1998) [SAIC00110-SAIC00316].

The Premise software ("Premise Software") [THOM00194621].

Kinney, Diane, "Reengineering SGML Implementation: Second Generation SGML Systems", GCA SGML '96 Conference Proceedings (Nov. 18-21, 1996) [THOM00197938-THOM00197940].

Li, C. and Wang, S., "Efficient Storage Structures for Temporal Object-Oriented Databases,", Dept. of Computer Science and Information Engineering, National Chiao Tung Univ., Hsinchu, Taiwan, Republic of China. [ THOM00213600-THOM00213612], Published 1994.

Larson, R., "Hypertext and Information Retrieval: Towards the Next Generation of Information Systems," Proceedings of the 51st ASIS Annual Meeting, Georgia, vol. 25 (1988) [THOM00221655-THOM00221660].

Peltonen, H, Mannisto, T., Alho, K., Sulonen, R., "An Engineering Document Management System," ASME Winter Annual Meeting, Louisiana, Nov. 28-Dec. 3, 1993 [THOM00221637-THOM00221654].

Cygnet, Mark, "Discovering Westlaw: The Essential Guide" West Publishing Corp., 1996 [THOM00221940-THOM00222172].

A sample Premise dataset: Annotated California Codes from 199X ("Premise Statutes") [THOM00194622-23].

Premise Publisher for Windows, User Manual ("Premise Publisher") [THOM00210191-THOM00210579].

Witzel, "Premise Research Software for Windows, User's Guide" , West Publishing Corp., MN, 1996 [THOM00210580-THOM00210844].

Int'l Standard ISO 8879:1986, "Information Processing—Text and office systems—Standard Generalized Markup Language (SGML)", Technical Corrigendum 1, Ref No. ISO 8879-1986/Cor.1:1996(E). "Westlaw DataBasics" (1993) ("DataBasics 1993") [THOM00211156-THOM00211869].

Teply, L., "Legal Research and Citation," West Publishing Company, MN (1992) [THOM00211117-THOM00211155].

Johnson, N., Berring, R., Woxland, T., "Winning Research Skills,", West Publishing Co., MN, (1991) [THOM00211088-THOM00211116].

"Password: Power Research," Westlaw, vol. 11, No. 5 (May 1991) [THOM00211072-THOM00211087].

Johnson-Maloney, Nancy, "Westlaw Reference Manual" West Publishing Corp., MN (1993) [THOM00210996-THOM00211071].

Wren, C., Wren, J., "Using Computers in Legal Research: A Guide to LEXIS and WESTLAW," Adams & Ambrose, Wisconsin, (1994) [THOM00210845-THOM00210954].

Dozier, C., Morton, J., "Introduction to Westlaw Database File Organization," (1991) [THOM00211870-THOM00211904].

AMPEX markup file for California Statute CA Bus & Prof Code § 2 (1996) [THOM00209405-THOM00209407].

Roban, Roberta, I., "Discovering Westlaw: The Essential Guide", West Publishing Co., (1992) [THOM00210955-THOM00210995].

McKennell, "Westmate 5.1 for Windows, User Manual," West Publishing Corp., MN (1993) [THOM00221863-THOM00221939].

Int'l Standard ISO 8879 "Information Processing—Text and office systems—Standard Generalized Markup Language (SGML)", Ref No. ISO 8879-1986(E). [THOM00329111-THOM00329315].

Uniform Commercial Code, Disk #1, Articles 1,2,3: An Electronic Publication of the Legal Information Institute of Cornell Law School (1995) [THOM00213531].

Law Desk NY Official Reports, 2d Series, Lawyers Cooperative Publishing (1995) [THOM00213528].

Law Desk United States Code Service Titles 1-50, US Constitution, Court Rules, Tables, 4th Quarter 1995, Lawyers Cooperative Publishing (1995) [THOM00213525].

Doggen, Jack, "Formex V3: Tagging the Laws: SGML Used for Complex Multilingual Legal Documents", GCA, SGML'96 Conference Proceedings, (Nov. 18-21, 1996).

Campbell, C. and McGurk, J., "Revising Statutes with Computer Support," 8 Statute Law Review 104 (1987). [THOM00197958-THOM 197968].

Chang, E.E., et al., "The Design and Implementation of a Version Server for Computer-Aided Design Data," Software—Practice and Experience, vol. 19(3), pp. 199-222, (Mar. 1989) John Wiley & Sons, Ltd. [THOM00213658-THOM00231681].

Corbett, M., "Indexing and Searching Statutory Text," 84 Law Library Journal 759-67 (1992). [THOM00197282-THOM00197291].

Cunliffe, D. et al, "Query-Based Navigation in Semantically Indexed Hypermedia", Proceedings of the Eighth ACM Conference on Hypertext HYPERTEXT '97 Publisher: ACM Press (Apr. 1997). [THOM00196903-THOM00196911].

DeRose, S., Maier, E., Orchard, D., XML Linking Language (XLink) Version 1.0, W3C Proposed Recommendation (Dec. 20, 2000). [THOM00198594-THOM00198627].

Dymalski, S., "Interleaf Tips and Tricks," OnWord Press, NM, (1994). [THOM00216029-THOM00216547].

Edelweiss, N., de Oliveira, J.P., Pernici, B., "An Object-Oriented Approach to a Temporal Query Language," 5th International Conference, DEXA 225 (1994). [THOM00213589-THOM00213599].

Elmasri, R. and Wuu, G., "A Temporal Model and Query Language for ER Databases," Proceedings of the Sixth International Conference on Data Engineering 76 (1990). [THOM00213623-THOM00213630].

Elmasri, R., et al., "The Time Index: An Access Structure for Temporal Data," Proceedings of the Very Large Data Bases Conference (VLDC), Brisbane, Australia (1990). [THOM00213577-THOM00213588].

Folio Views Software (See, e.g., Folio Views Infobase Production Kit Utilities Manual, Version 3.1, Provo, Utah: Folio Corporation (Jun. 1, 1994)). [THOM00216548-THOM00216749].

Francois, P., "Generalized SGML Repositories: Requirements and Modeling,", Computer Standards & Interfaces 18 (1996) 11-24, Elsevier. [THOM00198989-THOM00199002].

Fuller, M., Sacks-Davis, R., Wilkinson, R., "Presenting Query Results in a Hyperbase,", Dept. of Computer Science, RMIT, Melbourne, Australia (May 21, 1996). [SAIC000568-SAIC000577].

Goldfarb, C.F., "The SGML Handbook," Oxford University Press, NY (Feb. 28, 1991). [THOM00214673-THOM00215361].

Greenleaf, G. et al., "Public Access to Law via Internet: the Australian Legal Information Institute," 6 Journal of Law (1995). [THOM00196766-THOM00196779].

Guttman, A., "R-Trees: A Dynamic Index Structure for Spatial Searching," Proceedings of the ACM International Conference on the Management of Data (SIGMOD) (1984). [THOM00197192-THOM00197202].

Haake, A., "Under CoVer: The Implementation of a Context Virtual Server for Hypertext Applications," ACM ECHT '94 Proceedings (1994). [THOM00197203-THOM00197215].

Harold, E., "XML: Extensible Markup Language," IDG Books Worldwide, CA (1990). [THOM00198945-THOM00198967].

Hoey, M., "The Discourse Properties of the Criminal Statue," in Computer Power and Legal, Walter (ed.) (1988). [TH0M00196961-THOM00196981].

Goldfarb, Charles F.,et al. (Editor), "Information Processing-Hypermedia/Time-based Structuring Language (HyTime)-13 2d Edition", May 1997 [THOM00213693-THOM00214188].

Kimball, R. and Strehlo, K., "Why Decision Support Fails and How to Fix It," ACM SIGMOD Record, vol. 24, No. 3, (Sep. 1995). [THOM00209119-THOM00209124].

Kimball, R., "Is ER Modeling Hazardous to DSS?", DBMS, (Oct. 1995). [THOM00209125-THOM00209127].

Kolovson, C.P. and Stonebreaker, M., "Indexing Techniques for Historical Databases," Proceedings of the IEEE Data Engineering Conference 127, Memo. No. UCB/ERL M89/34, Apr. 6, 1989, University of California, Berkely, CA [THOM00209323-THOM00209335].

Kolovson, C.P. et al., S-Trees: Database Indexing Techniques for Multi-Dimensional Interval Data, Technical Report UCB/ERL M90/35, Electronics Research Laboratory, College of Engineering, University of California, Berkeley (1990). [THOM00209336-THOM00209693].

Leung, R., "Versioning on Legal Applications Using Hypertext," City Polytechnic of Hong Kong. [THOM00198112-THOM00198115].

Li, C. and Wang, S., "Efficient Storage Structures for Temporal Object-Oriented Databases," 5th International Conference, DEXA 246, Athens, Greece (1994). [THOM00222389-THOM00222412, THOM00213600-THOM00213612].

The ISO 8879 SGML Standard, "Information Technology—Hypermedia/time-based Structuring Language (HyTime)", Ref No. ISO/IEC 10744:1992(E).

Lum, V., et al., "Designing DBMS Support for the Temporal Dimension," ACM SIGMOD Record, vol. 14, Issue 2 (Jun. 1984). [THOM00213361-THOM00213646].

Maioli, C., Sola, S., Vitali, F., "Versioning Issues in a Collaborative Distributed Hypertext System," Technical Report UBLCS-93-6 (Apr. 1993), University of Bologna, Bologna, Italy. [THOM00196502-THOM00196517].

Merrick, F. (Australian Taxation Office) and Robertson, J. (Univ. of Tech.) "Proposal for Participation in the Workshop on Hypertext Systems and Version Support ," Proceedings of the Workshop on Versioning in Hypertext Systems, at ACM European Conference on Hypermedia Technology (ECHT'94). http://web.archive.org/web/19991023013328/cs-pub.bu.edu/students/grads/dgd/workshop/robertson.html [THOM00197078-THOM00197082].

Rotem, D. and Segev, A., "Physical Organization of Temporal Data," Proceedings of the Third International Conference on Data Engineering, Feb. 3-5, 1987, Los Angeles, CA. [THOM00213682-THOM00213692].

RMIT Multimedia Database Systems, SIM 2.3 Administrator Manual Series. Database Server Reference Manual, (Mar. 2, 1999). [SAIC014543-SAIC014574].

RMIT Multimedia Database Systems, SIM 2.3 Administrator Manual Series. SIM Administration Manual, (Feb. 25, 1999). [SAIC015000-SAIC015039].

RMIT Multimedia Database Systems, SIM 2.3 Administrator Manual Series. Web Server Reference Manual, (Feb. 25, 1999). [SAIC015269-SAIC015292].

RMIT Multimedia Database Systems, SIM 2.3 Programmer Manual Series. Ace Programmer's Guide, (Feb. 25, 1999). [SAIC013718-SAIC013820].

Volume 10: SIM Scripting Language Reference Manual. Ferntree Computer Corporation, Release 1.4 (Nov. 1, 1996). [SAIC009889-SAIC009930].

Volume 15: SIM General Support Library Programmers Manual. Ferntree Computer Corporation, Release 1.4 (Sep. 2, 1996). [SAIC007323-SAIC007332].

Volume 7: SIM PC Interface Tutorial and Reference Manual. Ferntree Computer Corporation, Release 1.4 (Sep. 4, 1996). [SAIC007750-SAIC007805].

Volume 8: SIM PC Interface Administrators Manual. Ferntree Computer Corporation, Release 1.4 (Nov. 1, 1996). [SAIC008570-SAIC008581].

Snodgrass, R. and Ilsoo, A., "A Taxonomy of Time in Databases," Proceedings of the ACM SIGMOD International Conference on Management of Data 236, Dept. of Computer Sciences, NC, Mar. 1985. [THOM00213647-THOM00213657].

Spinellis, D., "The Design and Implementation of a Legal Text Database," 5th International Conference, DEXA 339, Sena S.A., Greece (1994). [THOM00213613-THOM00213622].

Stonebraker, M., "The Design of the Postgres Storage System", Proceedings of the 13th VLDB Conference, Brighton (1987). [THOM00203337-THOM00203348].

The ISO 8879 SGML Standard, Information Processing—Text and office systems—Standard Generalized Markup Language (SGML), Ref No. ISO 8879-1986(E). [THOM00214191-THOM00214356, T].

Travis, B., Waldt, D., "The SGML Implementation Guide: A Blueprint for SGML Migration,", Springer-Verlag, Germany (1995). [THOM00204371-THOM00204649].

Van Herwijnen, E., "Practical SGML, Second Edition,", Kluwer Academic Publishers (1994). THOM00214378-THOM00214672.

Wagner, R. and Mansfield, R., "XML All-In-One Desk Reference for Dummies,", Wiley Publishing Co., NY (2003). [THOM00215362-THOM00216028].

Whitehead, E. James, "Versioning in Hypertext Systems,", Dept. of Information and Computer Science, Univ. of California, Irvine, CA, Dec. 7, 1999 [THOM00208156-THOM00208197].

Wilkinson, R., Arnold-Moore, T., Fuller, M., Sacks-Davis, R., Thom, J., Zobel, J., "Document Computing: Technologies for Managing Electronic Document Collections,", Kluwer Academic Publishers, (1998). [THOM00211996-THOM00212107].

Zizi, M., Beaudouin-Lafon, M., "Accessing Hyperdocuments Through Interactive Dynamic Maps," ACM, ECHT '94 Proceedings, Sep. 1994. [THOM00198637-THOM00198646].

Zobel, J., Wilkinson, R., Thom, J., Sacks-David, R., Macki, E., Kent, A., Fuller, M., "An Architecture for Hyperbase Systems", Dept. of Computer Science, RMIT and the Univ. of Melbourne, Technical Report 42, (Jun. 1991).[THOM00206364-THOM00206378].

Wilson, E., "Converting legal texts into expert systems," pp. 1-13 Computing Laboratory, University of Kent at Canterbury.

Wilson, E., Drafting legal documents with Justus' Clerk, pp. 1-14, Computing Laboratory, University of Kent at Canterbury.

Wilson, E., "A Guide to Justus: an overview of a hypertext legal database," BILETA: British and Irish Legal Education Technology Association, pp. 1-13, published 1990.

Wilson, E., "A Guide to Justus: an overview of a hypertext legal database,", pp. 1-11, Computing Laboratory, University of Kent at Centerbury, published 1990.

Wilson, E., "The Implications of Hypertext for Law Libraries", University of Kent at Canterbury.

Wilson, E., "Links and structures in hypertext databases for law," pp. 194-211, Computing Laboratory, University of Kent at Centerbury.

Wilson, E., "Mapping Law into Hypertext," pp. 1-47, University of Kent at Centerbury.

Wilson, E., "Mapping Law into Hypertext," pp. 221-240.

Wilson, E., "Mapping Legal documents into hypertext," pp. 1-22, Computing Laboratory, University of Kent at Canterbury.

Wilson, E., "On-Line Electronic Libraries," 9th BiLETA Conference Pre-proceedings, pp. 99-105, published 1995.

Wilson, E., "Integrated Information Retrieval for Law in a Hypertext Environment," pp. 1-16, Computing Laboratory, University of Kent at Centerbury.

Wilson, E. "Reference and Reference Inversion in Statutes and Cases: a Hypertext Solution," pp. 27-41 (1988) ("Wilson 1988"), University of Kent at Canterbury.

Wilson, E., "Integrated Information Retrieval for Law in a Hypertext Environment," Association for Computing Machinery, pp. 663-677 (1988).

Wilson, E., "Response to Raymond Coulon," International J. for the Semiotics of Law, vol. I, No. 2, pp. 217-220 (1988).

Wilson, E., "Justus: a Workstation for Information Retrieval in Law," pp. 1-12, University of Kent at Canterbury, published 1990.

Wilson, E., "Electronic Books: the automatic production of hypertext documents from existing printed sources," pp. 1-16, University of Kent at Canterbury.

Wilson, E., "Automatic Text Typing," Computers and the Humanities, 23, pp. 429-442 (1989).

Wilson, E., "A Hypertext Information Retrieval System for Lawyers," Law Technology Centre & Bileta Newsletter, vol. 2, No. 1, pp. 13-19 (Jun. 1989).

Wilson, E., "Justus for Lawyers," Computers and Law, No. 61, pp. 19-20 (Sep. 1989).

Wilson, E. "Reference and Reference Inversion in Statutes and Cases: a Hypertext Solution," in Prospects for intelligent retrieval: Informatics 10, ed. Kevin P. Jones, pp. 27-41 (1990).

Wilson, E., "Cases for Justus: Preparing a Case Database for a Hypertext Information Retrieval System," Computing Laboratory, University of Kent at Canterbury, pp. 1-18 (1990).

Wilson, E.' "Cases for Justus: Preparing a Case Database for a Hypertext Information Retrieval System," Literary and Linguistic Computing, vol. 5, No. 2, pp. 119-128 (1990).

Wilson, E., "A Computer Interface for Lawyers," in Human Jobs and Computer Interfaces, eds. Markku I. Nurminen and George R.S. Weir, pp. 53-69 (1991).

Brown, P.J., "GUIDE User Manual," Computing Laboratory, Twelfth impression, Univ. of Kent, pp. 1-48 (Nov. 1991).

Wilson, E., "Hypertext libraries: the automated production of hypertext documents," pp. 12, University of Kent at Canterbury.

Wilson, E., "Guiding Lawyers: Mapping Law into Hypertext," Artificial Intelligence Review 6,161-89 (1992) ("Wilson 1992").

Wilson, E., "Guiding Lawyers: Mapping Law into Hypertext," pp. 1-24, University of Kent at Canterbury.

Cameron, N., "Technology News," Computers and Law, pp. 23-24 (1992).

Wilson, E., "Reducing the Babel of Lawyers," Information Technology and Legal Education: Towards 2000, BILETA: British & Irish Legal Education Technology Association, pp. 1-14 (Apr. 9, 1992).

Wilson, E., ITAC and SCL Litigation Suppport Second Annual Conference, 28, Mar. 1992, Computers and Law, vol. 3, Issue 2, pp. 33-35 (May 1992).

Wilson, E., "Automating Computer Based Learning Packages for Law Design, Interface and Implementation," pp. 1-13, Computing Laboratory, University of Kent at Canterbury.

Wilson, E., "The Case for SGML: a Law Database, Hypertext and Information Retrieval," International Yearbook of Law Computers and Technology, vol. Seven, pp. 59-75 (1993).

Wilson, E., "Conference Report: The Juggernaut v. The Dinosaurs—The 5th Annual Information Systems for Lawyers," Computers and Law, vol. 4, Issue 91, pp. 17-18, 37-38 (Mar. 1993).

Wilson, E., "Automating Computer Based Learning Packages for Law Design, Interface and Implementation," Law Technology Journal, vol. 2, No. 2, pp. 24-29 (May 1993).

Wilson, E., "Link into Hypertext," VINE91, pp. 3-11 (Jun. 1993).

Wilson, Eve, "Hypertext and Law Librarians," The Law Librarian, vol. 25, No. 1, pp. 30-42 (Mar. 1994).

SGML Asia Pacific'96 Conference: Attendee List, published 1996.

Wilson, E. and O'Shea, Philip J., "European law databases: an experiment in retrieval," pp. 1-31 (Mar. 30, 1997).

Wilson, E. and Shepton, Peter D., "SGML as a Vehicle for Porting Hypertext Applications Between Systems," pp. 1-14 (May 31, 1997).

Wilson, E., "A Computer Interface for Lawyers,", University of Kent at Canterbury.

Int'l Standard ISO 8879:1986, "Information Processing—Text and office systems—Standard Generalized Markup Language (SGML)", Technical Corrigendum 2, Ref No. ISO 8879-1986/Cor.2:1999(E).

"Information processing—Text and office systems—Standard Generalized Markup Language (SGML)", ISO 8879:1986, (1986),166 pages.

"Search Report—EP 954808A4", (2002), 2 p.

Arnold-Moore, T , et al., "Databases of Legislation: the Problems of Consolidations", *Technical Report CITRI TR/94-9, Collaborative Information Technology Research Institute (CITRI)*, (1994), 1-22.

Arnold-Moore, T. , et al., "Managing a digital library of legislation", *Proceedings of the ACM International Conference on Digital Libraries 1997.*, ACM, New York, NY, USA.,(1997),175-183.

Arnold-Moore, T. , et al., "The ELF data model and SGQL query language for structured document databases", *Sixth Australasian Database Conference*, ADC'95, 17(2), (1995),17-26.

Azaria, Adrienne , "SGML: A Lifesaver in a Sea of Electronic Documents", *Network World*, 11(50), (Dec. 12, 1994).

Bobrow, D.C., et al., "An augmented state transition network analysis procedure.", *Proc. Internat. Joint Conf. on Artificial Intelligence*, Washington, D.C., (1969),557-567.

Clark, A. , et al., "Technics and praxis: Technological innovation and legal practice in modem society", *Yearbook of Law Computers and Technology*, 4, (1989),16-37.

Corbett, M. , "Indexing and searching statutory text", *Law Library Journal*, 84, (1992),759-67.

Corkern, C. , "I've Got an SGML Database—Why Do I Need HyTime?", http://www.infoloom.com/gcaconfs/WEB/seattle96/cc.htm, (1996),6 p.

Francois, P. , "Generalized SGML repositories: Requirements and modelling", *Computer Standards & Interfaces*, 18(1), (1996),11-24.

Freeman, Simon , "A Brief History of Time Travel", *Legal Information Management*, 4, (2004),28-30.

Greenleaf, G. , et al., "Teaching lawyers information retrieval: the AIRS training system.", *Information Online'88: Australian Online Information Conference*, Sydney,, (1988),189-195.

Johnson, P. , et al., "Legislative knowledge base systems for public administration: some practical issues", *Proceedings of the 3rd International Conference on Artificial Intelligence and Law*, (1991),108-117.

Kim, Hyunki , et al., "OOHS: an object-oriented hypermedia system", *Proceedings of 20th International Computer Software and Applications Conference*, 1996. COMPSAC '96., (1996),496-501.

Merkl, W. , et al., "KELP: a hypertext oriented user-interface for an intelligent legal fulltext information retrieval system", *International Conference on Database and Expert System Applications*, (1990),399-404.

Minsky, M. , "A framework for representing knowledge", *The Psychology of Computer Vision*, Patrick Henry Winston, author; McGraw-Hill Computer Science Series,(1975),211-277.

Moffat, Alistair , "Retrieval of Partial Documents", *Department of Computer Science*, The university of Melbourne, Parkville Victoria, Australia 3052.

Pereira, C. , et al., "Definite clause grammars for language analysis survey of the formalism and a comparison with augmented transition networks", *Artificial Intelligence*, 13(3), (1980),231-278.

Sacks-Davis, Ron , "A Standards-Based Approach to Combining Information Retrieval and Database Functionality", *Collaborative Information Technology Research Institute of RMIT and The University of Melbourne*.

Sacks-Davis, R. , et al., "Database systems for structured documents", *IEICE Transactions on Information and Systems*, E78-D(11), (1995),1335-42.

Sergot, M. J., et al., "The British Nationality Act as a logic program", *Communications of the ACM*, 29(5), (1986),370-386.

Stoyles, R. L., "The unfulfilled promise: Use of computers by and for legislatures.", *Computer/Law Journal*, 9, (1987),73-102.

Tapper, C, , "Computers and legislation", *Alabama Law Review*, 23(1), (1970),1Â?42.

Thorne, J. P., et al., "The syntactic analysis of English by machine", *Machine intelligence*,3, (1968),281-309.

Wilson, E. , "electronic books: the automatic production of hypertext documents from existing printed sources", *Fourth Annual Conference of the UW Centre for the New Oxford English Dictionary: Information in Text*, (1988),29-45.

Wilson, E. , "Integrated information retrieval for law in a hypertext environment", *Proceedings of the 11th Annual International ACM SIGIR Conference on Research and Development in Information Retrieval*, (1988),663-677.

Woods, W. A., et al., "Grammar, augmented transition", *Encyclopedia of Artificial Intelligence*, S. C. Shapiro and D. Eckroth, editors; John Wiley & Sons, Inc., New York,(1987),323-333.

Woods, W. A., "Transition network grammars for natural language analysis", *Communications of the ACM*, 13(10), (1970),591-606.

Arnold-Moore, T., Anderson, P., Sacks-Davis R., "Managing a Digital Library of Legislation," ACM, (1997) ("Arnold-Moore 1997-2") [THOM00196741-THOM00196750].

Arnold-Moore, T., "Information Systems for Legislation," (thesis), Department of Computer Science, Royal Melbourne Institute of Technology, Jan. 1998 ("Arnold-Moore Thesis") [THOM00202745-THOM00202984].

Arnold-Moore, T., Clemes, J., Tadd, M. "Connected to the Law: Tasmanian Legislation Using EnAct,", Law via the Internet '99, 1999. [THOM00210045-THOM00210061].

Arnold-Moore, T., "System Architecture: A Developer's View,", Royal Melbourne Institute of Technology, [TASGOVT000481-TASGOVT000504].

Cook, J., Arnold-Moore, T., Paice, S., "Legislation in Its Natural State," SGML Asia-Pacific Conference (Sep. 25, 1996) [THOM00236433-THOM00236441].

CITRI Information, [SAIC001979-1995].

McGhie, L., O'Sullivan, C., "Tasmanian, Western Australian and Queensland Legislation on the Internet," Australian Law Librarian (Jun. 1998) [THOM00209372-THOM00209376].

RMIT, "Connected to the Law: Tasmanian Legislation Using EnAct," [TASGOVT00361-TASGOVT00405], published 2000.

RMIT, "LSP Detailed Design Document,", Tasmanian State Service, version 2.0, Mar. 18, 1996 [SAIC002489-SAIC002606].

Tadd, M., "A New Way of Looking at the Law: The EnAct Legislation System,", Department of Premier and Cabinet, Tasmania [TASGOVT000527-TASGOVT000566].

Tasmanian State Service, "Legislation System Project: Business Case,", Version 2.0, Nov. 14, 1994 [SAIC002910-SAIC002986].

Tasmanian State Service, "Legislation System Project: System Design Specification," (Dec. 1994) [SAIC002746-SAIC002909].

Tasmanian State Service, "Legislation System Project: Functional Requirements Specification," , version 2.0, Mar. 18, 1996 [SAIC002489-SAIC002745].

Tasmanian State Service, "Legislative System Project Newsletter," (Jun. 1997) [TASGOVT000742-TASGOVT00744].

Tasmanian State Service, "Legislative System Project Newsletter,", No. 5 (Feb. 1998) [TASGOVT006367-TASGOVT006368].

Screen Shots of EnAct, SIM, 1998, RMIT MDSI group, Tasmanian State Gov't. [TASGOVT000524-TASGOVT000526].

Wilkinson, R., etal., "Document Computing: Technologies for Managing Electronic Document Collections,", RMIT University, Melbourne, Australia (1998) [SAIC00110-SAIC00316].

Tasmanian Legislation Online, http://www.thelaw.tas.gov.au (and subpages, including help screens) (also including prior versions found on www.archive.org) [THOM00213430-THOM00213441].

Tasmanian Legislation: Getting Started, http://web.archive.org/web/19981205075517/www.thelaw.tas.gov.au/start.html [THOM00213421], 1998.

Tasmanian Legislation_Background, http://web.archive.org/web/19990430002036/www.thelaw.tas.gov.au/background.html [THOM00213424-THOM00213429], 1999.

ELI 1997 Conference Program ("ELI Program") [THOM00208307-THOM00208323], 1997.

Kerr, P., etal., "An Introduction to Legal Resources on the Internet", Crucial Briefs Legal Research Services, (2000) [THOM00208324-THOM00208516].

SCALEplus User Manual (Version 3.0, Jan. 20, 1998) (SCALEplus UM) [THOM00209417-THOM00209434].

AustLII Guide to Legal Research on the Web, http://www.austlii.edu.au/austlii/guide/current/20030315--6.html#Heading1298 [THOM00211924-THOM00211935], 2003.

SCALEplus User Manual (Version 3.0, Jan. 20, 1998) ("SCALEplus UM 2") [THOM00221673-THOM00221747].

SCALEplus Secrets [AUSAG000191-AUSAG000194].

"Documentum LeafConnect for Interleaf", Documentum 1996 [THOM00196982-THOM00196984].

Interleaf 6 SGML, Interleaf Inc. (1995) [THOM00197307-THOM00197310].
Interleaf 6 Workgroup Tools, Interleaf Inc. (1996) [THOM00197311-THOM00197317].
Interleaf 5 <SGML> User's Guide, Interleaf Inc. (1994) [THOM00203415-THOM00203495].
Interleaf Publisher ("Interleaf Publisher") [THOM00203496-THOM00203497].
"Documentum Workspace", Documentum, Oct. 14, 1996 [THOM00197040-THOM00197042].
"Documentum Announces First Industrial-Strength Product for Web Content Management: Documentum RightSiteTM assembles current and individualized information for diverse user needs,", Documentum (Oct. 14, 1996) [THOM00197037-THOM00197039].
Ovum Evaluation of Documentum, Documentum 3.0, Jan. 1996 [THOM00196990-THOM00197036].
Ovum Evaluation of Interleaf, H2 Interleaf, RDM 2.6, (1996) ("Ovum Interleaf 1996") [THOM00197318-THOM00197351].
De Mets, G., "Consleg Interleaf: SGML Applied in Legislation,", GCA SGML '96, pp. 299-304, (1996) [THOM00196897-THOM00196902].
"Astoria: Information Repository & Management Infrastructure," (Apr. 1997) [THOM00211905-THOM00211912].
"XSoft Premieres Document Component Management System,", Chrystal Software, (Mar. 1996) [THOM00211913-THOM00211915].
"Chrystal Software Recognizes that Organizations Want to Reach Out to the Consumers of Their Document Information," Chrystal Software, 1997 [THOM00211916-THOM00211917].
"Astoria Delivers a Complete Document Management System that Offers Powerful Tools to Search, Edit, Share, and Track Documents and Their Components,", Chrystal Software 1997 [THOM00211918-THOM00211920].
XSoft, A Division of Xerox, Astoria (Jul. 12, 1996), found at http://xml.coverpages.org/duCharme-sgmldbms.html [THOM00198647-THOM00198649].
"XSoft Premieres Astoria; A Simpler Way to Manage 'Mega-Documents'", from PR Newswire (Mar. 12, 1996), found at http://www.highbeam.com/doc11G1-18079234.html [THOM00198650-THOM00198651].
XSoft Astoria, found at http://www.architag.com/tag/Article.asp?v=10&i=4&p=8&s=1 [THOM00198652-THOM00198653].
Law Desk NY Official Reports, 2nd Series, Lawyers Cooperative Publishing (1995) [THOM00213522-THOM00213524].
New York Consolidated Laws Service, Lawyers Cooperative Pub. Co. (1992) [THOM00213530].
Social Security Plus, Version 1.1, Clark Broadman Callaghan (Nov. 1994) [THOM00213521].
RIA OnPoint CD-ROM Tax Library, Research Institute of America (1992) [THOM00213529].
Core Materials on Legal Ethics: An Electronic Publication of the Legal Information Institute Cornell Law School, Cornell University (1995) [THOM00213536].
New Mexico Law on Disk, The Michie Company (1991) [THOM00213527].
Federal Rules of Civil Procedure, Cornell University (1995) [THOM00213532-THOM00213533].

* cited by examiner

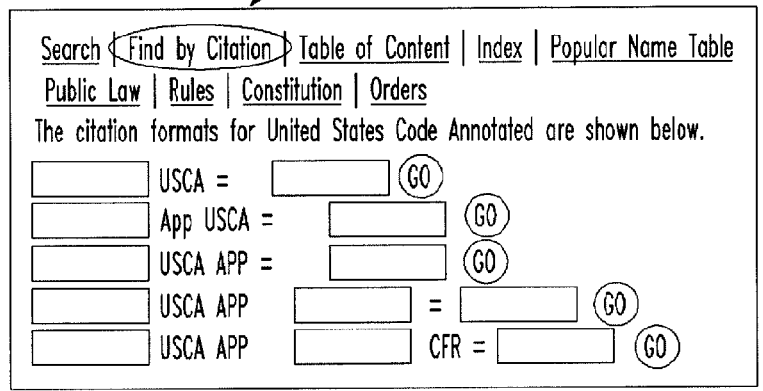
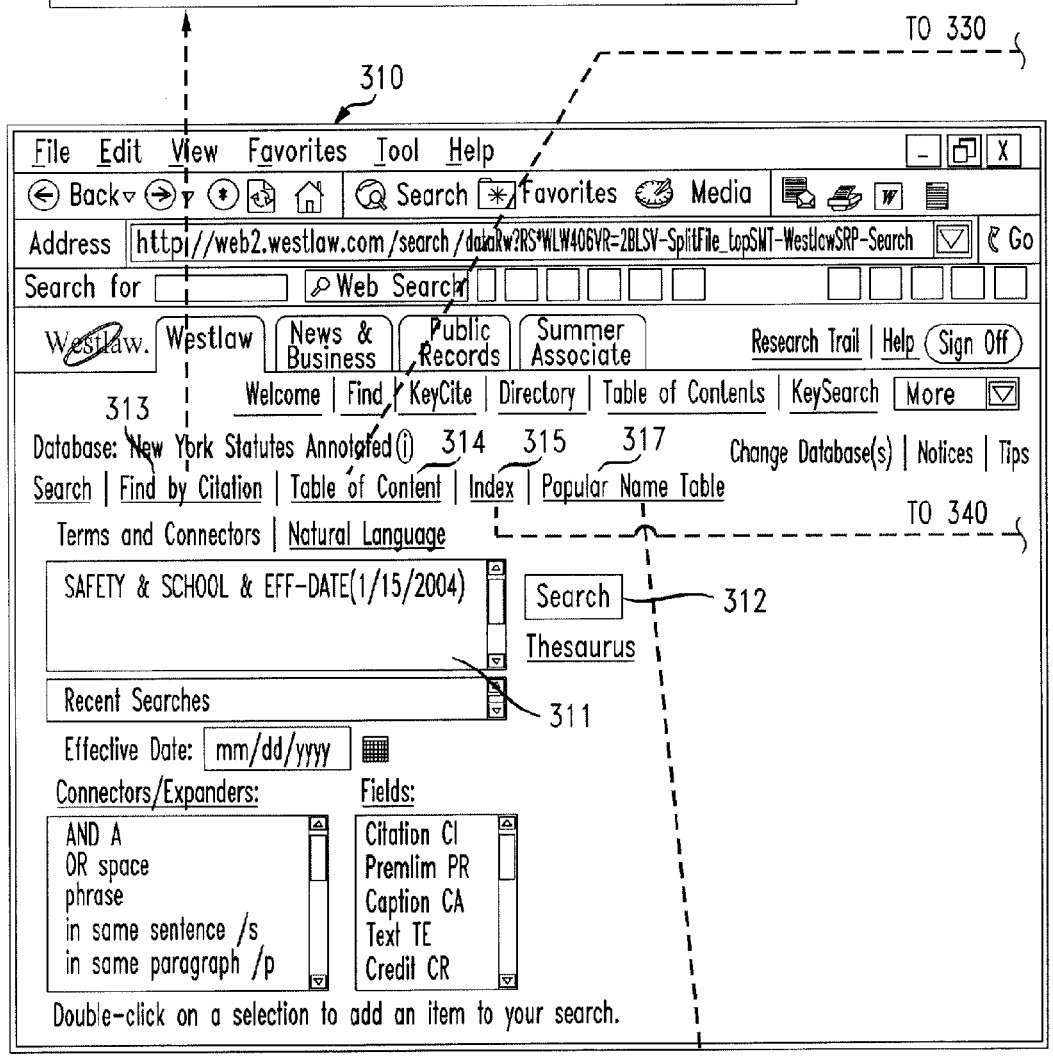
FIG. 3 (part 1)

330

Database: Untied States Code Annotated ⓘ   Change Database(s) | Database Notices | Search Tips
Search | Find by Citation ⟨Table of Content⟩ Index | Popular Name Table | Shortcuts to Tables
                          Untied States Code Annotated ⓘ

Click any box to select items to search, then click Go.   (GO)
☐ [+] THE ORGANIC LAWS OF THE UNITED STATES OF AMERICA
☐ [+] CONSTITUTION OF THE UNITED STATES
☐ [+] TITLE 1 GENERAL PROVISIONS
☐ [+] TITLE 2 THE CONGRESS
☐ [+] TITLE 3 THE PRESIDENT
☐ [+] TITLE 4 FLAG AND SEAL, SEAT OF GOVERNMENT, AND THE STATES
☐ [+] TITLE 5 GOVERNMENT ORGANIZATION AND EMPLOYEES
☐ [+] TITLE 6 SURETY BONDS(REPEALED)
☐ [+] TITLE 7 AGRICULTURE
☐ [+] TITLE 8 ALIENS AND NATIONALITY
☐ [+] TITLE 9 ARBITRATION
☐ [+] TITLE 10 ARMED FORCES
☐ [+] TITLE 11 BANKRUPTCY
☐ [+] BANKRUPTCY RULES AND OFFICIAL FORMS

340

Database: Untied States Code Annotated ⓘ   Change Database(s) | Database Notices | Search Tips
Search | Find by Citation | Table of Content ⟨Index⟩ Popular Name Table  ● Contains ○ Starts with
A B C D E F G H I J K L M N O P Q R S T U V W X Y Z   Scan for terms: [    ] (GO)

Income
Income Tax
Incompetence
Incontestability
Inconvenience
Incubator Reject
Inductance
Indextrendness
Indecency
Indemnity
Indemnity Company
industry Insurance
  Insurance
Indenture Security
Indenture Trust and Trustees
Indentured Labor
Indentures
Independence, Dedication of (1776)
Independence Day
Independence MO

*FIG. 3 (Part 2)*   300

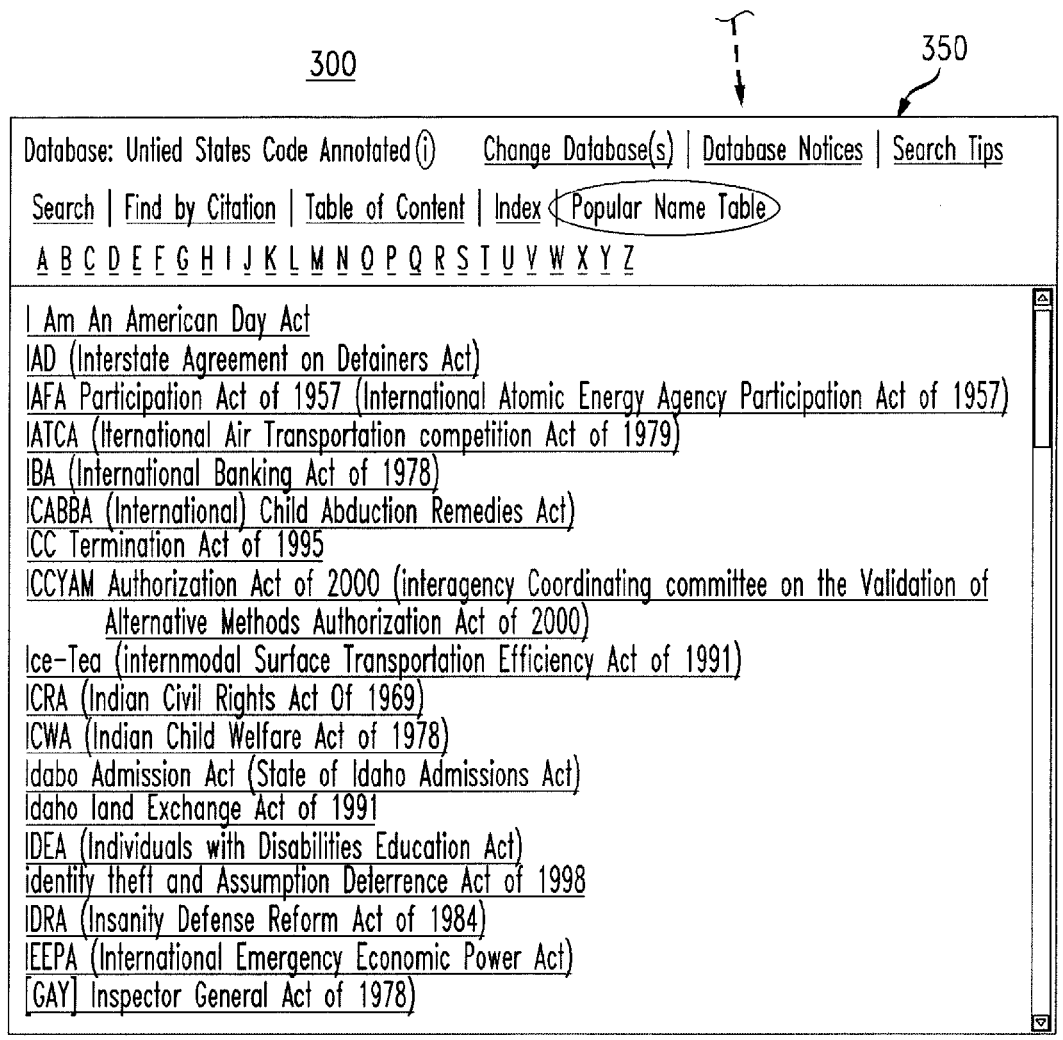
FIG. 3 (part 3)
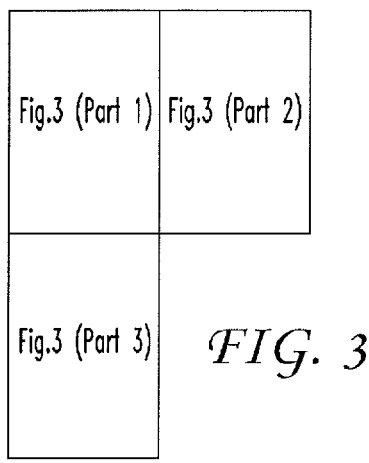
FIG. 3

Westlaw. [Colorado] [Westlaw] [Westnews]　　　MyWestlaw | Research Trail | Help | Sign Off Welcome | Find | KeyCite | Directory | Table of Contents | KeySearch　More Results List-31 Docs | Document Center Edit Search | Locate ▶ This statute has been amended.　KeyCite
▷ This statute has pending legislation.

History[4]
Citing References [123]
Add to KeyCite Alert
Document Text ->
Table of Contents
Subsection Outline
Versions
Case References
Recent Citing Cases
Notes of Decisions
Additional Citing Cases
History
Credits Statfile　CO ST § 25-17-202
　　　Effective Date: November 21, 2001
　　　Approx. 3 pages West's Colorado Revised Statutes Annotated Currentness Title 25. Health Environmental Control
　Article 17. Waste Diversion and Recycling
　→ Part 2. Strategies for Motor Vehicle Waste Tires §25-17-202. Waste Tire Recycling Development
　　　Fee--Cash Fund Created--Repeal (1) (a) (I) On and after January 1, 1994, and prior to July 1, 2000, a recycling development fee of one dollar shall be collected on any waste motor vehicle tire for any passenger vehicle, including any truck, weighing less than fifteen thousand pounds. In addition, such fee shall be collected on truck tires, including truck tractor, trailer, and semitrailer, weighing more than fifteen thousand pounds; except that no fee shall be collected for tires that are recapped or otherwise reprocessed for use. The fee authorized by this section shall be collected only at such time as the owner of the tire delivers or transfers the waste tire to a retailer of new tires for disposal.

To Fig. 4(Continued)

From Fig. 4

400

(II) On and after July 1, 2000, the recycling development fee described in subparagraph (I) of this paragraph (a) shall be seventy-five cents.

(b) For the purposes of this part 2:
  (I) Deleted by Laws 2000, Ch. 192, § 1, eff. May 24, 2000.
  (II) "Motor vehicle tire" means any tire used for a motor vehicle, as such term is defined in section 42-1-201-102(58),C.R.S.; except that motor vehicle shall not include motorcycles.
  (III) Deleted by Laws 2000, Ch. 192, § 1, eff. May 24, 2000.
  (IV) Deleted by Laws 2000, Ch, 192, § 1, eff. May 24, 2000.

(2) The retailers of new tires or of new or used motor vehicles, when available, shall collect the exchange fee and shall submit to the department of revenue any fees collected with any report required by the department in conjunction with the remittance of any sales tal remitted In accordance with article 26 title 39,C.R.S. The retailer may retain from fees collected an amount equal to the retailer's direct cost in complying with the provisions of this section, which amount shall not exceed three and one-third percent of the fee collected.

Print: Email Doc|All Options  [<-] Term [->]  [<-] Doc 1 of 31 [->]   △ Document Tools Historical Statutory Notes
Bill Drafts
Status References
Cross References
Uniform laws
Administrative References
Administrative Code
Federal Register
Administrative Decisions
Analytical References
Law Reviews
American Law Reports (ALR)
Treatises, Texts & Forms
West Key Numbers

| | | | | |
|---|---|---|---|---|
| Westlaw. | 510 Document Center – Outline (Type II) | | | Sign Off |

Welcome | Find | KeyCite | Directory | Table of Contents | KeySearch | More ▽

Results List-117 Docs | Document Center

Edit Search

Metagraph        Portfolio 42-3rd

Document Text

Outline →

Table of Contents

I. OVERVIEW
A. Deduction of Research or Experimental Expenditures
B. Tax Credit for Outlined Research Expenses
1. 1081 ERTA Provision
2. 1986 TRA Credit Extension
3. 1968 TAMRA Credit Extension
4. 1980 BRA Credit Extension and Modifications
5. 1999 ERA Credit Extension
6. 1991 Tax Extension Act
7. Revenue Recognition Act of 1993
8. 1996 Small Business Job Act
9. The Taxpayer Relief of Act 1997
10. 1998 Tax Extension Act
11. 1998 Tax Relief Extension Act

II. NATURE OF ELIGIBLE RESEARCH EXPENDITURES

A. In General
1. Background
2. Research or Experimental Expenditures Under Section 174
a. Lack of Statutory Definition
b. The '957 Regulations
c. The 1983 Proposed Regulations
d. The 1980 Proposed Regulations
e. The 1993 Proposed Regulations
f. The 1994 Regulations
3. Section d1(d):

| Fig.5 (Part 1) 510 | Fig.5 (Part 2) 520 |
|---|---|
| Fig.5 (Part 3) 530 | Fig.5 (Part 4) 540 |

*FIG. 5(Part 1)*

We̷s̷t̷l̷aw.   520  Document Center – Versions    Sign Off

Results List–31 Docs | Document Center
Edit Search | Locate

Statue    42 USCA § 26511
Effective Date: November 21, 2001

▶ This statute has been amended.   KeyCite
▶ This statute has pending legislation.
Stevens Citing References[11]
History[4]
Citing References [213]
Add to KeyCite Alert
Document Text
  Subsection Outline
  Versions →
Case References
  Recent Citing Cases
  Notes of Decisions
  Additional Citing Cases
History
  Credits
  Historical Statutory Notes
  Bill Drafts
Status References
  Cross References
  Uniform laws
Administrative References
  Administrative Code
  Federal Register
  Administrative Decisions
Analytical References
  Law Reviews
  American Law Reports (ALR)
  Treatises, Texts & Forms Untied States Code Annotated 2000 (USCA00)
Untied States Code Annotated 1999 (USCA99)
Untied States Code Annotated 1998 (USCA98)
Untied States Code Annotated 1997 (USCA97)
Untied States Code Annotated 1996 (USCA96)
Untied States Code Annotated 1995 (USCA95)
Untied States Code Annotated 1994 (USCA94)
Untied States Code Annotated 1993 (USCA93)
Untied States Code Annotated 1992 (USCA92)
Untied States Code Annotated 1991 (USCA91)

*FIG. 5(Part 2)*

500

Westlaw. | 530 Document Center – Case References | (Sign Off)

| Results List-29 Docs | Document Center |
| Edit Search | Locate |

KeyCite ▶ 42 USCA § 7651f
Effective Date: November 21, 2001

▶ This statute has been amended. KeyCite
▶ This statute has pending legislation.
Stevens Citing References[11]
History[4]
Citing References [213]
Add to KeyCite Alert
Document Text
 Subsection Outline
 Versions
Case References →
 Recent Citing Cases
 Notes of Decisions
 Additional Citing Cases
History
 Credits
 Historical Statutory Notes
 Committee Report
 Bill Drafts
Status References
 Cross References
 Uniform laws
Administrative References
 Administrative Code
 Federal Register
 Administrative Decisions
Analytical References
 Law Reviews
 American Law Reports (ALR)
 Treatises, Texts & Forms Notes of Decisions | Additional Citing Cases
Recent Citing Cases 1. Lignite Energy Council y. U.S.E.P.A. 193F.gd
930,932,49, ERC. 1682, 1682,336 US App. DC.
183,185,30 Enut.L.L. Rep. 20,279,20279, (D.C. Cir.
Aug. 21, 2002) No. 02-15-25

2. Lignite Energy Council y. U.S.E.P.A. 193F.gd
930,932,49, ERC. 1682, 1682,336 US App. DC.
183,185,30 Enut.L.L. Rep. 20,279,20279, (D.C. Cir.
Aug. 21, 2002) No. 02-15-25

Recent Citing Cases | Additional Citing Cases
Notes of Decisions

Classification of boilers 3
Compliance deadline 1
Compliance margins 8
Determining setting limits 2
Limits to burner unable to retrieve 6
Linear progression model use in setting limits 3
Retrofit burner exclusion rates 5
Revision of limits for existing burners 4

1. Classification of boilers

Environmental Protection Agency (EPA) Failed to justify its classification of retrofitted oil burner boilers as retrofitted boilers, for purposes of designating with nitrogen oxide limits such electric utility boilers were required to comply pursuant to Clean Air Act 2. Compliance deadline
Environmental Protection Agency (EPA) conclusion that Clean Art Act required certain deadline by which designates classes of Electric utility boilers comply with new emission limits for Nitrogen oxides Print: Email list

*FIG. 5(Part 3)*

```
                                           500
W̶e̶s̶t̶l̶a̶w̶.    540  Document Center - History          (Sign Off)

Results List-29 Docs | Document Center    KeyCite ▶    42 USCA § 7651f
Edit Search | Locate          ☐                  Effective Date: November 21, 2001

▶ This statute has been amended. KeyCite    Historical and Statutory Notes | Committee | Bill Drafts
▶ This statute has pending legislation.                     Credits
                                            (July 14, 1955, C. 960, Title IV, & 407,43 addel Nov. 15,
Stevens Citing References[11]               1990 Pub.L. 101-549, Title IV & 401
History[4]
Citing References [213]                         Credits| Committee Reports | Bill Drafts
Add to KeyCite Alert                            Historical and Statutory Notes
Document Text                               Revision Notes and Legislative Reports
 Subsection Outline                         1990 Acts, Senate Report No. 101-228 House Conference
 Versions                                   Report No. 101-952 and statement by President, see 1990
Case References                             U.S. Code cong. and Adm memsp .3385
 Recent Citing Cases                        References in Text
 Notes of Decisions                         Part B of Title III, referred to in subsecs. (d) and (4),
 Additional Citing Cases                    means Title III of the Clean Air Act, Act July 1999 e.
History  ──────────◀───────                 260,23 added, which is classified to subchapter III of
 Credits                                    this Chapter, But title does not contain parts for
 Historical Statutory Notes                 p̶r̶o̶v̶i̶s̶i̶o̶n̶s̶ of the Clean Air Act relating to permits see
 Committee Report                           subchapter V (section 7661 et.seq.) of this Chapter.
 Bill Drafts
Status References                           Effective and Applicability Provisions
 Cross References                           1990 Acts Section effective Nov. 15, 1990 except as
 Uniform laws                               otherwise provided, see section 711(b) of Pub 1
Administrative References                   101-342 set out as a note under section 7401 of
 Administrative Code                        this title
 Federal Register                           Saving Provisions
 Administrative Decisions                   Suits, actions, or proceeding commerce | under This
Analytical References                       chapter as in effect prior to Nov. 15 1990, not to abate
 Law Reviews                                by reason of the taking effect of amendments by Pub.L.
 American Law Reports (ALR)                 101-54 except as otherwise provided for see Section
 Treatises, Texts & Forms                   712(a) of Pub.L. 101-542 set out as a setup for section
                                            7401 of this title Print: Email Doc|All Options
```

*FIG. 5(Part 4)*

600

Westlaw. | 610 Document Center - Administrative References | Sign Off

| Results List-29 Docs | Document Center |
| Edit Search | Locate |

KeyCite ▸ 42 USCA § 7651f
Effective Date: November 21, 2001

▸ This statute has been amended. KeyCite
▸ This statute has pending legislation.
Stevens Citing References[11]
History[4]
Citing References [213]
Add to KeyCite Alert
Document Text
  Subsection Outline
  Versions
Case References
  Recent Citing Cases
  Notes of Decisions
  Additional Citing Cases
History
  Credits
  Historical Statutory Notes
  Committee Report
  Bill Drafts
Status References
  Cross References
  Uniform laws
Administrative References →
  Administrative Code
  Federal Register
  Administrative Decisions
Analytical References
  Law Reviews
  American Law Reports (ALR)
  Treatises, Texts & Forms Federal Register | Administrative Decisions
Administrative Code 1. 16C.F.R. § 313.1 CODE OF FEDERAL REGULATION TITLE 16-COMMERCIAL PRACTICES CHAPTER I--FEDERAL TRADE COMMISSION PART 313-PRIVACY OF CONSUMER FINANCIAL.

2. 34C.F.R. § 5668.06 CODE OF FEDERAL REGULATION TITLE 34-EDUCATION CHAPTER VI-OFFICE OF POSTSECONDARY EDUCATION, DEPARTMENT OF EDUCATION PART 668-STUDENT ASSISTANCE GENERAL PROVISIONS § 668.46 Institutional security policies and crime statistics.

Administrative Code | Administrative Decisions
Administrative Code

1. PROPOSED RULES ENVIRONMENTAL PROTECTION AGENCY 40 C.R.F. Part 51,76, and 96 Supplemental Notice for that Finding of Significant Contribution and Rule making for Certain States in the Ozone Transport Assignment Group Region for Purpose of Reducing Regional Transport of Ozone Monday May ~~23 1999 5902-01, 1998~~ WL 229151 (F.R.)

2. RULES and REGULATIONS ENVIRONMENTAL PROTECTION AGENCY 40 CFR, Part 51,76 and 96 Acid Rain Program; Nitrogen Oxides Emission Reduction Program Thursday, December 19, 1996 61 FR 67112-01, 1996 WL 725543 (F.R.)

3. RULES and REGULATIONS DEPARTMENT of ENERGY Federal Energy Regulatory Commission 18 CFR Parts 35 and 385 Promoting Wholesale Competition Through Open Access Non-Discriminatory Transmission Services by Public Utilities Recovery of Stranded Costs by Public Utilities and Transmitting Utilities Friday, May 10, 1996 61 FR 21540-01, 1996 WL 239663(F.R.)

Print: Email Doc

From Fig. 6

600

| Westlaw. | 620 Document Center – Analytical References | Sign Off |

| Results List-29 Docs | Document Center | KeyCite ▶ 42 USCA § 7651f |
| Edit Search | Locate | Effective Date: November 21, 2001 |

▶ This statute has been amended. KeyCite
▷ This statute has pending legislation.

Stevens Citing References[11]
History[4]
Citing References [213]
Add to KeyCite Alert
Document Text
  Subsection Outline
  Versions
Case References
  Recent Citing Cases
  Notes of Decisions
  Additional Citing Cases
History
  Credits
  Historical Statutory Notes
  Committee Report
  Bill Drafts
Status References
  Cross References
  Uniform laws
Administrative References
  Administrative Code
  Federal Register
  Administrative Decisions
Analytical References ➝
  Law Reviews
  American Law Reports (ALR)
  Treatises, Texts & Forms

---

American Law Reports (ALR) | Treatises, Texts & Forms
Selected Law Reviews

Employee privacy rights, Thomas J. Barnes and John Patrick White, 64 Mich. B.J. "04 (1985)
Financial record privacy--what are and what should be rights of customer of depository institution. Don L Hicewander, 16 St. Mary's L.J. 601(1085).
Privacy, Symposium, 1985, 18 J. Marshall L. Rev, 815.
Rights of students in need of special education. Diana Pullin, 66 Mich.B.J. 30 (1087).

Additional Law Reviews

☐1 A HOME OF ONES OWN: THE FAIR HOUSING AMENDMENTS ACT OF 1988 AND HOUSING DISCRIMINATION AGAINST PEOPLE WITH MENTAL DISABILITIES, 43 Am. U.L.Rev.925,994 (1994)

☐2 THE(NOT SO) LITTLE HOUSE ON THE PRAIRIE; THE HIDDEN COSTS OF THE HOME MORTGAGE INTEREST DEDUCTION, 32 aRIZ sT l.t. 1347, 1397 (2000)

☐3 THE HUD REINVENTION: A CRITICAL ANALYSIS, 5 B.U.Pub Int. L.J. 239,264 (1996)

☐4 THE PUBLIC HOUSING TENANCY: VARIATIONS ON THE COMMON LAW THAT GIVE SECURITY OF TENURE AND CONTROL, 43 Cath U.L.Rev 681,743(1994)

☐5 COUNTRY POWERS IN ASSISTED HOUSING PROGRAMS: THE CONSTITUTIONAL LIMITS IN NEW YORK ag Ford rmmWebrf 109,164+(1993)

Law Reviews | Treatises Texts & Forms
Selected American Law Reports (ALR)

Control of interstate pollution under Clean Air Act as amended in 1977(42 USCA 55 7401-7626). 82 ALR Fed 316.
Federal requirements for public participation in adoption, submission, and approval of state implementation Print: Email Doc|All Options

*FIG. 6 (Continued)*

SYSTEMS, METHODS AND SOFTWARE FOR RESEARCHING STATUTORY INFORMATION

CROSS REFERENCE TO RELATED APPLICATIONS

This is a continuation of U.S. patent application Ser. No. 11/334,804 filed on Jan. 17, 2006, now U.S. Pat. No. 8,032,533, which claims priority to U.S. Provisional Patent Application No. 60/644,465 filed on Jan. 14, 2005, both of which are incorporated herein by reference in their entireties.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2005, Thomson Reuters Global Resources.

BACKGROUND

1. Field

The present invention concerns systems, methods, and software for online researching of legal statutes and related information.

2. Brief Discussion of Related Art

The American legal system relies heavily on written laws and judicial opinions. Because of this, judges and lawyers within our legal system are continually researching an ever-changing body of statutes and past opinions (case law) to make decisions and advise their clients.

To facilitate these searches, companies, such as West Publishing Company of St. Paul, Minn. (doing business as Thomson West), collect and publish statutes and judicial opinions from across the United States in both print and electronic form. The electronic form of the statutes and case law are electronically searchable via the Internet through the www-.Westlaw.com legal research website.

Although services, such as Westlaw.com, have provided enormous benefits to the legal industry, the present inventors have recognized considerable room for improvement, particularly in the area of statutes research. This aspect of legal research is notoriously difficult and time-consuming. Even with electronic search capabilities, many researchers prefer using print materials.

Accordingly, the present inventors have recognized a need for tools that facilitate researching statutory information.

SUMMARY

To address this and/or other needs, the present inventors devised systems, methods, and software that promise to improve the ability of researchers to find, verify, read, and/or interpret statutory information. One exemplary system provides a number of graphical user interfaces that facilitate researching statutory information. For finding statutory information, one exemplary interface provides options for users to access statutory information by citation, by table of contents, by index, and/or by popular name. For verification, a results interface presents specific statutory information in combination with visual indicators, such as red or yellow flags, that indicate the validity or status of the information.

For reading ease, requested statutory information is presented in one pane of an interface and an adjacent pane provides a list of links to related information, such as tables of contents, other versions of a statute, case law, scholarly materials, legislative history, cross-referenced statutes, and administrative-law materials. The list of links also functions as a checklist for statutory research. And for interpreting the statutory information, the list of links includes lists to cases that cite the statute, for example, a list of citing cases decided within the last 60 days of a given access.

In accordance with an embodiment, a system to retrieve information is provided. The system includes a plurality of legal statute databases and a server. The legal statute databases maintaining a plurality of legal statutes. The server transmits to a client access device a table of contents of a selected legal statute database as a plurality of search-selectable legal statute categories each associated with one or more legal statutes. The server receives from the client access device a query including a selection of at least one search-selectable legal statute category and a search criterion. The server retrieve at least one legal statute from the selected legal statute database based on the at least one selected legal statute category and the search criterion of the query. The server transmits to the client access device the retrieved at least one legal statute.

In accordance with another embodiment, a method of retrieving information is provided. The method includes transmitting from a server to a client access device a table of contents of a selected legal statute database as a plurality of search-selectable legal statute categories each associated with one or more legal statutes. The method further includes receiving at the server from the client access device a query including a selection of at least one search-selectable legal statute category and a search criterion. Thereafter, the method includes retrieving at least one legal statute from the selected legal statute database based on the at least one selected legal statute category and the search criterion of the query. Also, the method includes transmitting to the client access device the retrieved at least one legal statute.

In accordance with a further embodiment, a computer-readable storage medium is provided. The storage medium includes operational instructions that, when executed by a processor, cause the processor to transmit to a client access device a table of contents of a selected legal statute database as a plurality of search-selectable legal statute categories each associated with one or more legal statutes. The operational instructions also cause the processor to transmit to receive from the client access device a query including a selection of at least one search-selectable legal statute category and a search criterion. Thereafter, the operational instructions cause the processor to transmit to retrieve at least one legal statute from the selected legal statute database based on the at least one selected legal statute category and the search criterion of the query. Also, the operational cause the processor to transmit to transmit to the client access device the retrieved at least one legal statute.

BRIEF DESCRIPTION OF THE DRAWINGS

FIG. 3 is a facsimile of an exemplary graphical user interface which corresponds to one or more embodiments of the invention;

FIG. 4 is a facsimile of a graphical user interface which corresponds to one or more embodiments of the invention;

FIG. 5 is a facsimile of an exemplary graphical user interface which corresponds to one or more embodiments of the invention; and FIG. 6 is a facsimile of an exemplary graphical user interface which corresponds to one or more embodiments of the invention.

DETAILED DESCRIPTION

This description, which references and incorporates the above-identified Figures, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
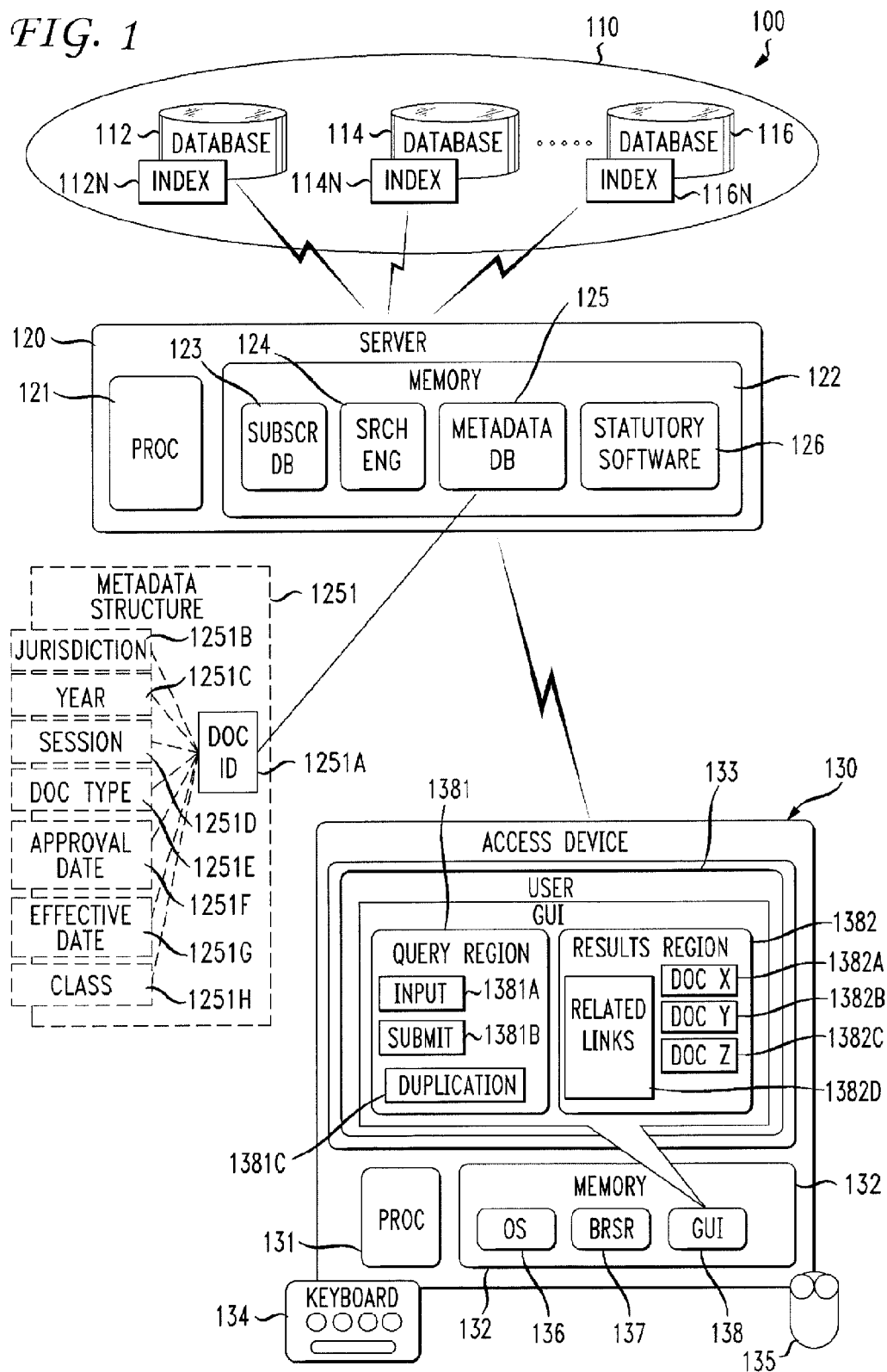
FIG. 1 is a block diagram of an exemplary legal research system corresponding to one or more embodiments of the invention.

FIG. 1 shows an exemplary online information-retrieval system 100, which incorporates teachings of the present invention. System 100 includes one or more databases 110, one or more servers 120, and one or more access devices 130.

Databases 110 include a set of non-statutory legal documents 112, a set of statutory legal documents 114, and other legal documents 116. Documents 112, in the exemplary embodiment, include case law documents from federal, state, and/or local jurisdictions. Statutory legal documents 114 include federal, state, and/or local statutes and administrative rules as well as legislative history. Other legal documents 116 include legal articles, encyclopedias, and so forth. Databases 110 may also include other content as implied below or in the referenced provisional application.

Databases 110 (112, 114, 116), which take the exemplary form of one or more electronic, magnetic, or optical datastorage devices, include or are otherwise associated with respective indices (112N, 114N, 116N). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a search module 124, a metadata database 125 and a legal research module (or software) 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, search engines 124, metadata database 125 and legal research module 126.

Subscriber database 123 includes subscriber-related data for controlling, administering, and managing pay-as-you-go or subscription-based access of databases 110. In the exemplary embodiment, database 123 includes user identifiers, access credentials, and billing or pricing information.

Search module 124 includes one or more search engines and related user-interface components, for receiving and processing queries against one or more of databases 110, with use of indices 114N. In the exemplary embodiment, one or more search engines associated with search module 124 provide Boolean, tf-idf (term frequency-inverse document frequency), and/or natural-language search capabilities.

Metadata database 125 includes a number of data structures, such as data structure 1251, to facilitate fulfillment of queries, particularly those related to statutes or versions thereof In the exemplary embodiment, data structure 1251 includes a document identifier 1251A, which is logically associated with a jurisdiction indicator 1251B, a year indicator 1251C, a session indicator 1251D, a document type 1251E, an approval date 1251F, an effective date 1251, and a class indicator 1251H.

Statutory research software 126 stored in memory 122 (e.g., storage medium) comprises instructions that are machine readable and/or executable by processor 121 for wholly or partly defining web-based user interfaces (such as a user interface 138 and those shown in subsequent figures) over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, a memory 132, a display 133, a keyboard 134, and a graphical pointer or selector 135 (also known as a mouse).

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). The exemplary embodiment defines one or more portions of interface 138 using applets or other programmatic objects or structures from server 120.

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B, and a duplication button 1381C. Query input region 1381A also allows a user to input text or provide other input for defining or selecting a query. Query submission button 1381B allows user to initiate submission or communication of the query to server 120. Search-results region 1382 is also defined in memory and upon rendering includes one or more interactive control features 1382A-1382D.

Control features 1382A-1382C correspond to one or more statutory documents enable a user to selectively access or retrieve one or more corresponding documents relevant to the governing query from databases 110 via server 120. Each of the control features 1382A-1382C includes a respective document identifier or label, such as DOCX, DOCY, or DOCZ, identifying respective titles or other aspects of the associated documents. Control feature 1382D, which in the exemplary embodiment is representative of one or more control features, enables a user to selectively invoke display of other materials related to the one or more of the statutory documents associated with control features 1382A-1382C.

In the exemplary embodiment, each of these control features of interface 138 takes the form of a hyperlink or other browser-compatible command input. Although FIG. 1 shows query region 1381 and results region 1382 as being simultaneously displayed, some embodiments present them at separate times.

Exemplary Method(s) of Operation

Figure 2:
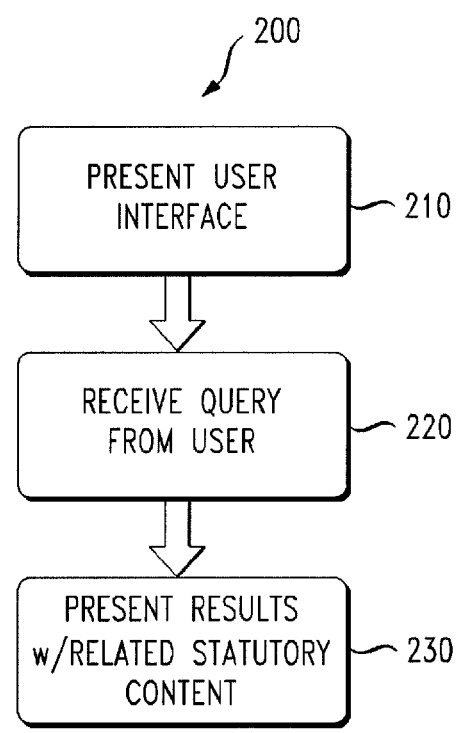
FIG. 2 is a flowchart of an exemplary method associated with system of FIG. 1 and corresponding to one or more embodiments of the invention.

FIG. 2 shows a flow chart 200 illustrating in greater detail an exemplary method of operating system 100. Flow chart 200 includes a number of process blocks 210, 220 and 230. Though arranged serially in the exemplary embodiment, other embodiments may reorder the blocks, omits one or more blocks, and/or execute two or more blocks in parallel using multiple processors or a single processor organized as two or more virtual machines or sub-processors. Moreover, still other embodiments implement the blocks as one or more specific interconnected hardware or integrated-circuit modules with related control and data signals communicated between and through the modules. Thus, the exemplary process flow is applicable to software, firmware, hardware, and hybrid implementations.

At block 210, the exemplary method begins with presentation of a user interface tailored for statutory research. In the exemplary embodiment, this entails a user directing a browser in a client access device, such as device 130 in FIG. 1, to an internet-protocol (IP) address for an online information-retrieval system, such as system 100, and then logging onto the system using appropriate credentials. Successful login results in a web-based search interface, such as interface 138 in FIG. 1 (or one or more portions thereof) being output from server 120, stored in memory 132, and displayed by client access device 130.

Block 220 entails receiving a query from the user. In the exemplary embodiment, the user defines the query by interacting with the interface, specifically entering terms of the query into a query input region and finally actuating a query submission feature to transmit the query to a server, such as server 120 for processing. In some embodiments, the user query takes the form of a popular name of a statute, that is, a statute alias, which can be used to assist in identification of the corresponding statute or portion thereof. In others, it takes the form of a citation for a statute, or a request for a table of contents.

FIG. 3 shows an exemplary query or search interface 300 that may be substituted for or added to region 1381. Interface 300 includes interface displays 310, 320, 330, 340 and 350. Interface display 310 includes a query input region 311, a search command input 312, find-by-citation feature 313, table-of-contents feature 314, index feature 315, and a popular name feature 317. User selection of features 313, 314, 315, and 317 invokes display of respective interface displays 320, 330, 340, and 350. Execution then advances to block 230 (as shown in FIG. 2).

Block 230 entails presenting a graphical user interface listing the identified set of documents. In the exemplary embodiment, this entails displaying a listing of the identified set of one or more statutes on interface 138, specifically within or as part of search-results region 1382, along with related statutory content, such as one or more indicators regarding the status of the statutes.

FIG. 4-6 shows an exemplary search results interface 400-600, which may be substituted for or added to search results region 1382.

Conclusion

In furtherance of the art, the inventors have presented, among other things, various exemplary systems, methods, and software which facilitate online research of statutory materials.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A system to retrieve information, the system comprising:
a plurality of legal statute databases; and
a server coupled to the legal statute databases, the server configured to:
transmit to a client access device a table of contents of a selected legal statute database as a plurality of search-selectable legal statute categories, each of the search-selectable legal statute categories associated with one or more legal statutes, the search-selectable legal statute categories and the associated legal statutes based on a received effective date;
receive from the client access device a query including a selection of at least one search-selectable legal statute category and a search criterion;
retrieve at least one legal statute from the selected legal statute database based on the query and the received effective date; and
transmit to the client access device the at least one legal statute retrieved from the selected legal statute database.

2. The system of claim 1, wherein the server is further configured to:
receive from the client access device the effective date; and
define the search-selectable legal statute categories of the table of contents and the associated legal statutes based on the received effective date.

3. The system of claim 1, wherein the server comprises at least one data structure to facilitate fulfillment of the query, each of the at least one data structure including a document identifier for each of the at least one legal statute, the document identifier associated with an effective date, an approval date, and a jurisdiction.

4. The system of claim 3, wherein the document identifier is further associated with a year, a session, a document type, and a class.

5. The system of claim 1, wherein the server is further configured to:
transmit to the client access device at least one user-interface element associated with the at least one legal statute, the at least one user-interface element identifying the associated at least one legal statute;

receive selection of a user-interface element from the client access device; and transmit a legal statute associated with the selection of the user-interface element to the client access device.

6. The system of claim 5, wherein the server is further configured to:

transmit to the client access device at least one related user-interface element associated with the at least one user-interface element for the at least one legal statute, the at least one related user-interface element identifying at least one information document related to the at least one legal statute;

receive selection of a related user-interface element from the client access device; and transmit an information document associated with the selection of the related user-interface element to the client access device.

7. The system of claim 6, wherein the information document includes one of: the table of contents; another version of the at least one legal statute; scholarly material; legislative history of the at least one statute; cross-referenced statute; administrative-law material; a legal case related to the at least one legal statute; and a legal case that cites the at least one statute.

8. A method of retrieving information, the method comprising:

transmitting from a server to a client access device a table of contents of a selected legal statute database as a plurality of search-selectable legal statute categories, each of the search-selectable legal statute categories associated with one or more legal statutes, the search-selectable legal statute categories and the associated legal statutes based on a received effective date;

receiving at the server from the client access device a query including a selection of at least one search-selectable legal statute category and a search criterion;

retrieving at least one legal statute from the selected legal statute database based on the query and the received effective date; and transmitting to the client access device the retrieved at least one legal statute retrieved from the selected legal statute database.

9. The method of claim 8, the method further comprising:

receiving at the server from the client access device the effective date; and defining the search-selectable legal statute categories of the table of contents and the associated legal statutes based on the received effective date.

10. The method of claim 8, the method further comprising:

providing at least one data structure to facilitate fulfillment of the query, each of the at least one data structure including a document identifier for each of the at least one legal statute, the document identifier associated with an effective date, an approval date, and a jurisdiction.

11. The method of claim 10, the method further comprising:

associating the document identifier is further with a year, a session, a document type, and a class.

12. The method of claim 8, the method further comprising:

transmitting from the server to the client access device at least one user-interface element associated with the at least one legal statute, the at least one user-interface element identifying the associated at least one legal statute; ute;

receiving at the server from the client access device a selection of a user-interface element; and transmitting to the client access device a legal statute associated with the selection of the user-interface element.

13. The method of claim 12, the method further comprising:

transmitting from the server to the client access device at least one related user-interface element associated with the at least one user-interface element for the at least one legal statute, the at least one related user-interface element identifying at least one information document related to the at least one legal statute;

receiving at the server from the client access device a selection of a related user-interface element; and transmitting to the client access device an information document associated with the selection of the related user-interface element.

14. The method of claim 13, wherein the information document includes one of: the table of contents; another version of the at least one legal statute; scholarly material; legislative history of the at least one statute; cross-referenced statute; administrative-law material; a legal case related to the at least one legal statute; and a legal case that cites the at least one statute.

15. A non-transitory machine-readable storage medium comprising instructions that, when executed by a processor, cause the processor to:

transmit to a client access device a table of contents of a selected legal statute database as a plurality of search-selectable legal statute categories, each of the search-selectable legal statute categories associated with one or more legal statutes, the search-selectable legal statute categories and the associated legal statutes based on a received effective date;

receive from the client access device a query including a selection of at least one search-selectable legal statute category and a search criterion;

retrieve at least one legal statute from the selected legal statute database based on the query and the received effective date; and transmit to the client access device the retrieved at least one legal statute retrieved from the selected legal statute database.

16. The non-transitory machine-readable storage medium of claim 15, further comprising instructions that, when executed by a processor, cause the processor to:

receive from the client access device the effective date; and define the search-selectable legal statute categories of the table of contents and the associated legal statutes based on the received effective date.

17. The non-transitory machine-readable storage medium of claim 15, further comprising instructions that, when executed by a processor, cause the processor to:

provide at least one data structure to facilitate fulfillment of the query, each of the at least one data structure including a document identifier for each of the at least one legal statute, the document identifier associated with an effective date, an approval date, and a jurisdiction.

18. The non-transitory machine-readable storage medium of claim 17, further comprising instructions that, when executed by a processor, cause the processor to:

associate the document identifier is further associated with a year, a session, a document type, and a class.

19. The non-transitory machine-readable storage medium of claim 15, further comprising instructions that, when executed by a processor, cause the processor to:

transmit to the client access device at least one user-interface element associated with the at least one legal statute, the at least one user-interface element identifying the associated at least one legal statute;

receive selection of a user-interface element from the client access device; and transmit a legal statute associated with the selection of the user-interface element to the client access device.

20. The non-transitory machine-readable storage medium of claim 19, further comprising instructions that, when executed by a processor, cause the processor to:

transmit to the client access device at least one related user-interface element associated with the at least one user-interface element for the at least one legal statute, the at least one related user-interface element identifying at least one information document related to the at least one legal statute;

receive selection of a related user-interface element from the client access device; and transmit an information document associated with the selection of the related user-interface element to the client access device.

21. The non-transitory machine-readable storage medium of claim 20, wherein the information document includes one of: the table of contents; another version of the at least one legal statute; scholarly material; legislative history of the at least one statute; cross-referenced statute; administrative-law material; a legal case related to the at least one legal statute; and a legal case that cites the at least one statute.

\* \* \* \* \*